United States Patent
Leonardi et al.

(10) Patent No.: US 6,773,763 B2
(45) Date of Patent: Aug. 10, 2004

(54) METHOD OF MANUFACTURING A PERMANENT MAGNET USING KINETIC SPRAY

(75) Inventors: Franco Leonardi, Dearborn Heights, MI (US); John Matthew Ginder, Plymouth, MI (US); Robert Corbly McCune, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 10/064,580

(22) Filed: Jul. 29, 2002

(65) Prior Publication Data

US 2002/0182313 A1 Dec. 5, 2002

Related U.S. Application Data

(62) Division of application No. 09/681,733, filed on May 30, 2001, now Pat. No. 6,592,935.

(51) Int. Cl.$^7$ ................................................. H01F 1/00
(52) U.S. Cl. .................... 427/550; 427/11; 427/123; 427/128; 427/131; 427/132; 427/189; 427/191; 427/215; 427/216; 427/217; 427/221; 427/405; 427/421; 427/422; 427/427; 427/445; 427/446; 427/447; 427/457; 427/598
(58) Field of Search ................................. 427/128, 123, 427/11, 405, 189, 131, 191, 132, 215, 216, 217, 221, 421, 422, 427, 445, 446, 447, 457, 550, 598

(56) References Cited

U.S. PATENT DOCUMENTS

| | | | |
|---|---|---|---|
| 4,897,238 A | 1/1990 | Kouyama et al. | |
| 5,302,414 A | 4/1994 | Alkhimov et al. | |
| 5,391,403 A | 2/1995 | Kawado et al. | |
| 5,646,464 A | 7/1997 | Sickfus | |
| 5,795,626 A | 8/1998 | Gabel et al. | |
| 6,001,426 A | 12/1999 | Witherspoon et al. | |

OTHER PUBLICATIONS

McCune et al., An Exploration of the Cold Gas–Dynamic Spray Method for Several Materials Systems, Proc. National Thermal Spray Conference, 1995, no month available.

*Primary Examiner*—Bernard Pianalto
(74) *Attorney, Agent, or Firm*—Damian Porcari

(57) ABSTRACT

A method of manufacturing a permanent magnet by the steps of preparing an admixture of magnetic material and binder material, the admixture material having a particle size of less than 325 mesh. Then heating a carrier gas to a temperature substantially below the melting point of either component of the admixture. The admixture is introduced into the carrier gas and the admixture is sprayed atop a ductile carrier. The admixture adheres to the carrier and forms a solid permanent magnet. An electric field is applied to the sprayed admixture to create a permanent magnetic moment.

15 Claims, 5 Drawing Sheets

METHOD OF MANUFACTURING A PERMANENT MAGNET USING KINETIC SPRAY

CROSS REFERENCE TO RELATED APPLICATIONS

This application is a divisional of U.S. patent application Ser. No. 09/681,733, now U.S. Pat. No. 6,592,935 filed May 30, 2001, entitled "Method Of Manufacturing Electromagnetic Devices Using Kinetic Spray".

BACKGROUND OF INVENTION

1. Field of the Invention

The present invention relates to a method of manufacturing electric machines including motors and generators using kinetic spraying metal forming. More specifically, the present invention is directly related to a method of manufacturing both conductive metallizations, as well as permanent and soft magnets by applying highly-defined, high-velocity sprays of conductors and magnetic materials in powder form to an appropriate carrier without the need for additional molding, shaping, sintering or tooling steps.

2. Description of the Related Arts

"Electric machines" in the broadest sense, are fabricated from specialized arrangements of conductive coils, magnetic materials, supporting structures, and ancillary components such as fasteners, wires, and other conductors.

Most "permanent" magnets and some "soft" magnets are produced through a molding and sintering operation from an admixture of magnetic materials and appropriate binders in an initially powdered form, wherein the final shape of the particular magnet is dictated by the mold tooling used. Additionally, "permanent" magnets must be magnetized by exposing the magnet to sufficiently high magnetic fields so as to introduce a strong, semi-permanent magnetic alignment of individual magnetic dipoles and larger physical domains. "Soft" magnetic materials, usually predicated on iron and several of its alloys, are often fabricated from sintered powders or laminated sheets, produced such that the intrinsic magnetic moment for the material is not permanent, but rather is determined by the magnitude of the applied field. Coils made predominantly from copper wire are used both to generate magnetic fields and electromagnetic torque in the airgap, with the ultimate goal to generate motion, as in an electric motor, or to generate electric power as in a generator or alternator. Electric machines, which may be either generators or motors, are thus assembled from specific geometric arrays of coils, magnetic materials and supporting structures or carriers. Assembly processes for electric machines involve attachment of magnets, laminations and coils to housings designed to receive the magnet. When multiple magnets are assembled, it becomes difficult to precisely align and attach each magnet to the article or housing. A process that eliminates the molding, hardening and assembly steps greatly simplifies the construction process and reduces the cost and complexity of the resultant article. Moreover, by supplying the constituent materials of the particular electric machine as "coatings" in contrast to separate three-dimensional structures, it is possible to realize new and different electric machines, fabricated by an unconventional process onto heretofore unused carriers or platforms.

It is possible to thermal spray magnetic materials onto a carrier as described in U.S. Pat. No. 5,391,403 ('403). This thermal spray process has been used where relatively weak magnetic fields are sufficient such as for use in a sensor. The method described in the '403 patent is capable of producing very thin magnetic coatings between 100–200 $\mu$m in thickness. This coating was made from magnetic oxides of iron, cobalt and nickel. The intense heat from the thermal spray process causes the base metals to oxidize and produce oxides. The oxides produce much weaker magnetic fields than the base metals from which they originate. They lack the capacity to produce sufficiently strong fields required for motors and generators. The present invention is directed to a method of producing magnets from base metals that are capable of producing strong magnetic fields.

U.S. Pat. No. 4,897,283, teaches a method of producing aligned permanent magnets by a high temperature plasma thermal spray of samarium-cobalt. Auxiliary heat is applied before, during and after the thermal spray to produce the magnet. Because the deposition is conducted in an environmentally-controlled chamber, oxidation of the metallic alloy is expected to be minimal. Masking is optionally used to produce fine deposition features, as is well-known in the thermal-spray art. The temperature needed to produce the plasma spray degrades the magnetic properties of the resulting article.

Thermal spray has the advantage of being capable of rapidly producing a layer of bulk material atop a carrier, but the heat needed to create the molten metal droplets can alter the magnetic properties of the sprayed material. Another family of thermal spray technologies that does not use high temperatures for producing molten droplets is collectively known as kinetic spraying. One kinetic spray technique predominantly used to date has been that of cold gas-dynamic spraying or "cold-spray". The technique described in U.S. Pat. No. 5,302,414 incorporated herein by reference, ('414) uses a nozzle whose acceleration and focusing properties are determined by gas dynamics and geometry to produce a jet of solid or semi-solid particles that impinge onto a deformable substrate material, typically metal. The particles have a size range of approximately 1–50 micrometers. The particles are introduced under pressure into a supersonic gas stream created through use of a converging-diverging (deLaval) nozzle. The particles, once accelerated to near supersonic velocities, impact on a collecting substrate where they form a thick deposit, by a process believed to be similar to explosive compaction or mechanical plating. The coating may be applied for a number of purposes such as corrosion or wear resistance. The '414 patent, states that the application method may be used for electrically or magnetically conducting coatings. However, the '414 patent does not provide examples of electrically or magnetically conductive coatings. The methods described all produce very thin (<400 $\mu$m) coatings. These coatings are generally too thin to be of use as magnets such as those typically found in electric machines. The present invention is directed to the application of bulk material to produce magnets capable of creating magnetic fields useful in motors, generators and similar devices.

The invention described herein utilizes the "cold spray" process to produce electric machine elements as "coatings" or deposits on an appropriate substrate or carrier.

While the '414 patent discloses electrical and magnetic materials, it does not provide for a methodology for permanent magnet deposits, composite magnets, deposition conditions, properties of soft magnetic materials, or suggested geometries for planarized or 'coating-based' electric machines.

SUMMARY OF INVENTION

The present invention is directed to a method of manufacturing magnets using a kinetic-spray process where the magnetic material is not exposed to high temperatures. This reduces the formation of unwanted oxides and enables the precise build-up of material atop a carrier into the final desired shape of the magnet. The process utilizes a high-speed kinetic spray propelling a fine metal powder to a target carrier. The metal powder has a ductile component. The mixture adheres to the carrier, generally by a mechanical attachment or metallurgical bond. The ductile component serves as the bonding site for subsequent layers of kinetic spray. The ductile material bonds to the ductile material of the previous layers. The kinetic spray process or "cold" gas-dynamic spraying enables the deposition of soft magnetic materials with improved magnetic properties compared to those produced by high-temperature thermal spraying based on arcs, plasmas or flames. Additionally, the invention provides for the formation of planar electrical coils using the same technology, such that entire classes of electric machines can be fabricated using a single spray technology. It will be apparent to those skilled in the art that in addition to cold-spray deposition, other kinetic spray processes may also be used to produce the low temperature, highly-focused deposition such as electrically pulsed plasmas as shown in U.S. Pat. No. 6,001,426, issued Dec. 14, 1999, tribo-acceleration as shown in U.S. Pat. No. 5,795,626, issued Aug. 18, 1998, and rail gun plasma acceleration.

DETAILED DESCRIPTION

Figure 1:
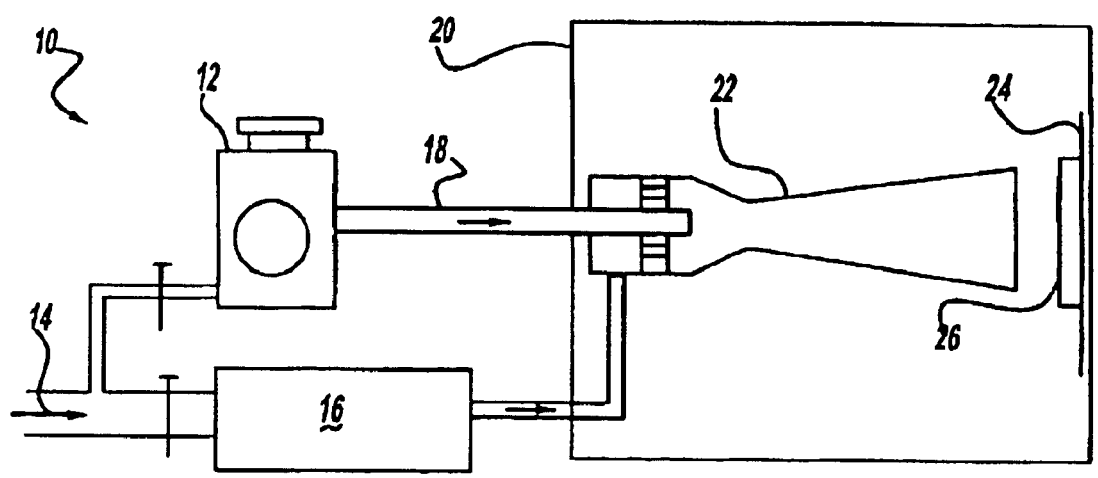
FIG. 1 is a diagram of a kinetic cold-spray apparatus that may be used in the preparation of permanent magnets.

The present invention will be described through a series of drawings, which illustrate the manufacture of a permanent magnet motor. Other items such as generators, solenoids, actuators and sensors may be manufactured using the same or similar technique and equipment and are included within the invention described herein. The following elements are a word list of the items described in the drawings and are reproduced to aid in understanding the invention:

10 cold-spray system
12 powder feeder
14 high pressure gas inlet
16 heater
18 powder feed tube
20 enclosure
22 supersonic nozzle
24 carrier
26 bulk material
28 permanent magnet material
30 soft magnetic binder material
32 coil
34 electrical contact
36 permanent magnet array
38 planar coil
40 motor
42 support
44 core
46 insulator
48 armature core
50 magnetic flux The invention is a manufacturing method for producing permanent magnets. The permanent magnets that are the subject of this invention have a sufficient magnetic strength to be used in motors and generators and are generally referred to a 'strong magnets'. They are distinguished from 'weak magnets' that may be used for sensors and memory storage devices. Preferably, the magnets are produced in the final desired shape without additional hardening or shaping steps. The magnets are formed in layers directly atop a carrier. Preferably, the carrier is the housing, spindle or other device which utilizes the magnet. The invention will be described as a method of making a magnet that will be used in an electric motor. Other devices that utilize magnets may be made using the same equipment, material and techniques as are taught herein such as generators, alternators, solenoids, actuators or sensors.

The equipment used for the manufacture of permanent magnets may also be used to create electrical traces, electrical coils and wiring. In this fashion, complete electric machines may be fabricated using a cold-spray gun, or similar kinetic deposition processes, by alternately producing the permanent magnet components and then the electrical wiring and coils as will be more completely described.

The kinetic spray process utilizes a cold-spray system 10. The system 10 includes a powder feeder 12. The power feeder 12 supplies the powder materials for kinetic spraying. A high pressure gas 14 propels the powder. A heater 16 heats the gas to a temperature much less then the melting point of the powder. The powder is directed through a powder feed tube 18 to the high pressure chamber of a supersonic nozzle 22. The nozzle 22 propels the powder particles at a carrier 24. The particles are deposited atop the carrier 24 as a bulk build-up of material 26.

Figure 2:
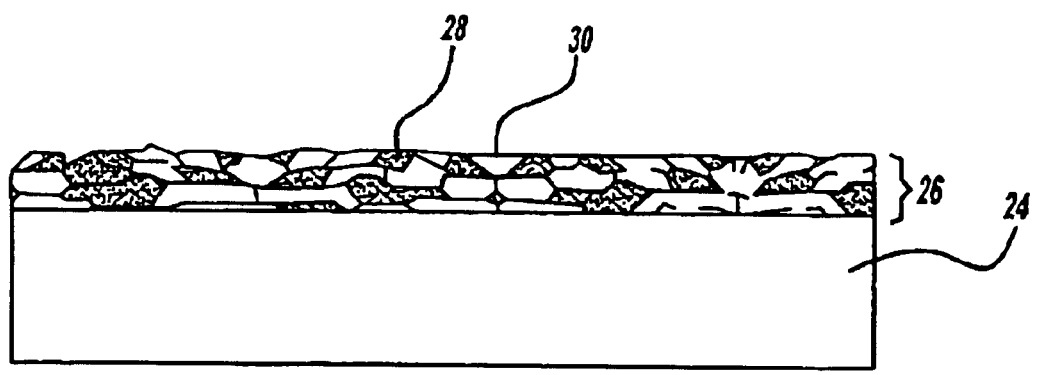
FIG. 2 is a cross-sectional view of hard and soft magnetic materials applied atop a carrier by cold spraying.

Illustrated in FIG. 2 is a schematized cross-sectional view of the metallurgical microstructure of a magnet produced by the cold-spray process. The carrier 24 may be either a non-magnetic or soft magnetic material. Aluminum was found to be a good carrier material because it is not ferromagnetic and provides a ductile striking surface that enables the powdered metal to adhere to the aluminum surface. Aluminum does not, however, provide a low reluctance flux return path needed in high energy-density motor/generator applications. Iron would provide a preferred substrate in these applications. The bulk material 26 is an admixture of the powders that are sprayed atop the carrier 24. The bulk material 26 preferably includes a permanent magnet material 28 and a soft magnetic binder material 30. The selection of the cold-spray materials includes both magnetic and conductive materials as described below. The magnetic composite 26 utilizes a ductile, soft phase such a high-purity iron as a binder to effectively provide both a mechanical interlocking of second phase magnetic particles, as well as a metallurgical bond at the atomic level in some instances (e.g. when the interleaving particle structures are not interrupted by porosity, contamination or non-adhering oxide phases. In general, the precise type of interparticle bonding will be a function of the material types employed, their degree of purity, and the conditions under which the compact is formed.

Materials

Magnetic Binder and 'Soft Magnet' Materials

Iron is the principal ingredient of "soft" magnetic materials that effectively act as a conduit for controlling direction, strength, and storage of magnetic fields. Desirable physical properties are high internal purities and controlled interfaces in bulk aggregates or pieces to minimize core losses that occur as magnetization is propagated through the material. In such devices as transformer cores, this is achieved through use of insulated lamination layers of sheet electrical steel. In compacted irons or powder-metallurgy materials, this is effected on a smaller scale through use of soft-iron powders with polymeric or lubricant coatings and metal surfaces with developed oxide layers. Cold spraying of relatively pure iron such as Ancorsteel™ 1000 produced by the Hoeganaes Corporation, results in a soft magnetic material with a density of approximately 7.46 g/cm3 compared to a density of 7.86 g/cm3 for bulk pure iron. Saturation magnetization of cold-sprayed Ancorsteel™ 1000 iron was found to be 1.98 Tesla compared to 2.15 Tesla for pure iron. Cold-spraying conditions which produced this material were achieved with pure helium gas at an inlet temperature of 325–360° C., a gas pressure of 300 psi (2.1 MPa), and iron particle sizes as sieved to −325 mesh (max particle approximately 45 micrometers). A thermal spray sample of plain 0.8 carbon steel produced by twin-wire arc process in comparison to the cold spray material showed lower density (6.98 g/cm3) and an appreciably poorer saturation magnetization of approximately 1.52 Tesla and quasistatic energy loss of 2.1 J/kg/cycle vs. 1.8 j/kg/cycle for the cold-sprayed iron material. These measurements suggest that the cold-spray iron material is greatly superior to conventional thermally-sprayed carbon steels when comparing its ability to be magnetized.

Core losses for cold-sprayed irons, which would dictate higher-frequency energy losses in applications such as motors and transformers, may be reduced through compaction of powder materials having oxide or polymeric shells, with nominally pure iron in the material core. An example of such a material is Somaloy™ 500 of H ö gan ä s Corporation. These powders are generally formed into magnetic materials through warm compaction processes such as those used in powder metallurgy, however, cold spraying permits development of surface deposits of soft magnetic material without use of separate tooling, thus permitting a variety of structures to be implemented on the appropriate surface.

It is possible to reduce the core loss of the sprayed magnetic material by providing resistance to eddy current flow between adjacent particles of binder material. This effect may be achieved by coating individual binder particles with an eddy current resistant coating such as oxide films, organic films and polymeric films.

Permanent Magnet Materials

The second ingredient for a range of electromagnetic devices to be fabricated by cold-spraying processes is a permanent magnet deposit. Since cold-sprayed iron forms a soft magnet having a saturation magnetization approaching that of pure iron, it is possible to form a permanent magnet from the pure iron material by exposure to high magnetic fields. This process is used to produced conventional cast iron magnets for low-cost, low-performance applications. Alternatively, improved and higher strength permanent magnets in layer or coating form can be developed through a manner of the cold spray process in which a composite structure is achieved by spraying an admixture of a permanent magnet material powder (e.g. neodymium-iron-boron ($Fe_{14}Nd_2B$), AlNiCo, $Sm-Co_5$) and suitable ferromagnetic binder such as pure iron, nickel or cobalt, which are known to be sprayable by the cold-gas or related process. Layers so deposited will be in a non-magnetic condition, so it will be necessary as a process step to use high magnetic fields to induce a permanent magnet moment in the resulting structure.

A composite microstructure may be obtained by cold-spraying an admixture of permanent magnet material and soft magnetic binder. Such composite microstructures containing hard embedded phases in soft ductile materials such as high-purity iron or nickel have been demonstrated for carbides in a nickel-chromium alloy matrix in a paper by McCune, R. C., A. N. Papyrin, J. N. Hall, W. L. Riggs, II and P. H. Zajchowski, "An Exploration of the Cold Gas-Dynamic Spray Method for Several Materials Systems," Advances in Thermal Spray Science and Technology, Proc. 8th. National Thermal Spray Conference, C. C. Berndt and S. Sampath, Eds., ASM Int'l., 1995 p 1–5, and incorporated herein by reference. The amount of binder phase necessary to develop robust composites is approximately 50% by volume and is believed to be a function of the plasticity of the permanent magnet material; less binder phase being required for more ductile materials. A minimum amount of "ductile phase" required to form a permanent magnet deposit is on the order of 10–15% by volume of the softer phase. High-purity nickel is immediately substitutable for iron in these compacts, and it is believed that cobalt would also be readily usable as a binder at particle velocities greater than those used for iron or nickel.

The present invention produces strong magnetic materials have very low content of oxides; less than 5% by volume. This low oxide concentration produces strong magnets that better retain a permanent magnetic dipole alignment and produce stronger magnetic fields.

Copper

The third element of electromagnetic devices is a copper (or other high-conductivity metal) winding. Copper is used for connection points or pads and for making coil elements in both motor and generator configurations. The cold spray copper deposit is developed from high purity, (preferably <0.25% wt oxygen content) inert gas-atomized copper powder with an optimum particle size range between 10 and 30 micrometers. In the cold-gas spray method, copper is deposited at a gas pressure of 2–2.4 MPa (280–340 psi) using dry nitrogen gas, with gas preheat conditions of 300–325° C. Nozzles may be configured to provide metal deposits having widths as small as 1 mm. Deposit thickness of as much as 3–5 mm are possible for larger metallization widths (e.g. 10 cm). Other metals having good electrical conductivity and particle plasticity will be apparent, including silver, gold and aluminum of purities greater than 99%. Alloyed or so-called dispersion-strengthened metals of comparable electrical conductivity are also candidate materials for the electrical metallization or coil structures.

Figure 3:
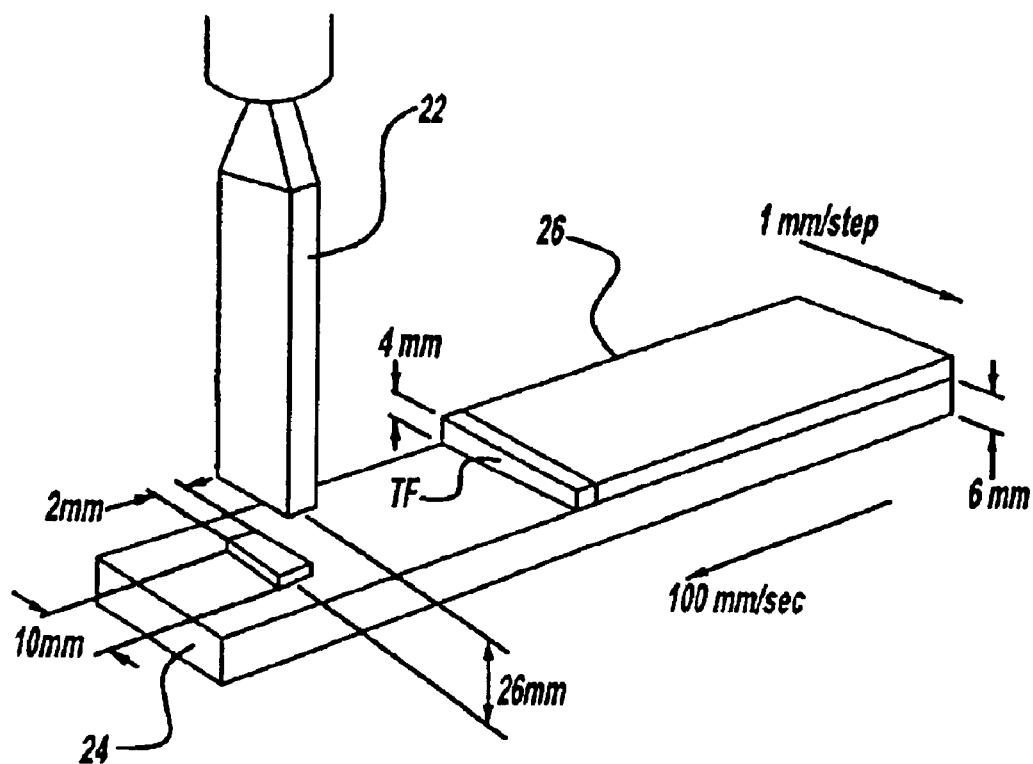
FIG. 3 is a perspective view of a cold spraying device producing a complex article.

Illustrated in FIG. 3 is a typical deposition arrangement for a cold-spray magnet, wherein the sprayed material is directed through the supersonic converging/diverging nozzle 22 is applied to an aluminum carrier 24 at short (<2.5 cm) standoff distance from the nozzle end. By manipulating the carrier in its own plane or by manipulating separately the nozzle, it is possible to "draw" traces TF of any dimension. The thickness of the deposit at any position is governed by the residence time during which the spray is maintained at any given X-Y position of the substrate or nozzle. FIG. 3 shows a rectangular nozzle, which is optimized for the cold-gas spray process, although it will be appreciated that other nozzle geometries or entire nozzle arrays may be constructed to produce patterns as can be designed.

In addition to producing a basic permanent magnet, the invention enables the production of electric machines such as motors, generators, alternators, solenoids and actuators. The basic method is thus described in terms of a patternable arrangement of conductors, bulk material of hard and soft magnetic materials on appropriate substrates for generation of electromagnetic elements.

Electric motors and generators are identical in terms of manufacturing and construction and differ mainly in their function, being often referred to commonly as "electric machines". In some cases an electronic converter is used as an interface between the power supply (typically either the electrical power grid or a battery) and the electric machine. It is often the configuration of this conversion device that determines whether the electric machine in question will operate as a motor, a generator ("alternator" in most automotive applications) or both.

An electric machine is typically composed of two types of elements, that can be arbitrarily placed on the rotating element (the "rotor") or the stationary element (the "stator"). These two elements constitute a field-producing element called the "excitation" and a torque-producing element called the "armature". The latter is most typically a polyphase winding, comprised of several coils properly connected. The "excitation" can be provided by a coil, a multiplicity of coils or by a permanent magnet array.

Figure 4:
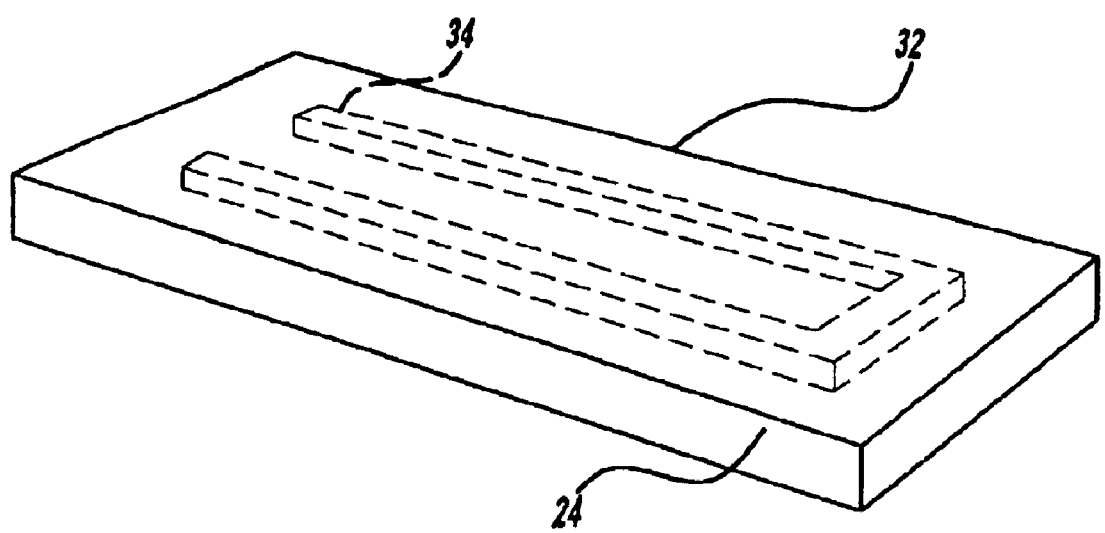
FIG. 4 is a perspective view of an article produced by cold spray.

Illustrated in FIG. 4 is an electrical coil 32 made using the same cold-spray process described. A copper electrical contact 34 is deposited as the bulk-material. This construction may be used to fabricate the coil portion of the motor.

Figure 5:
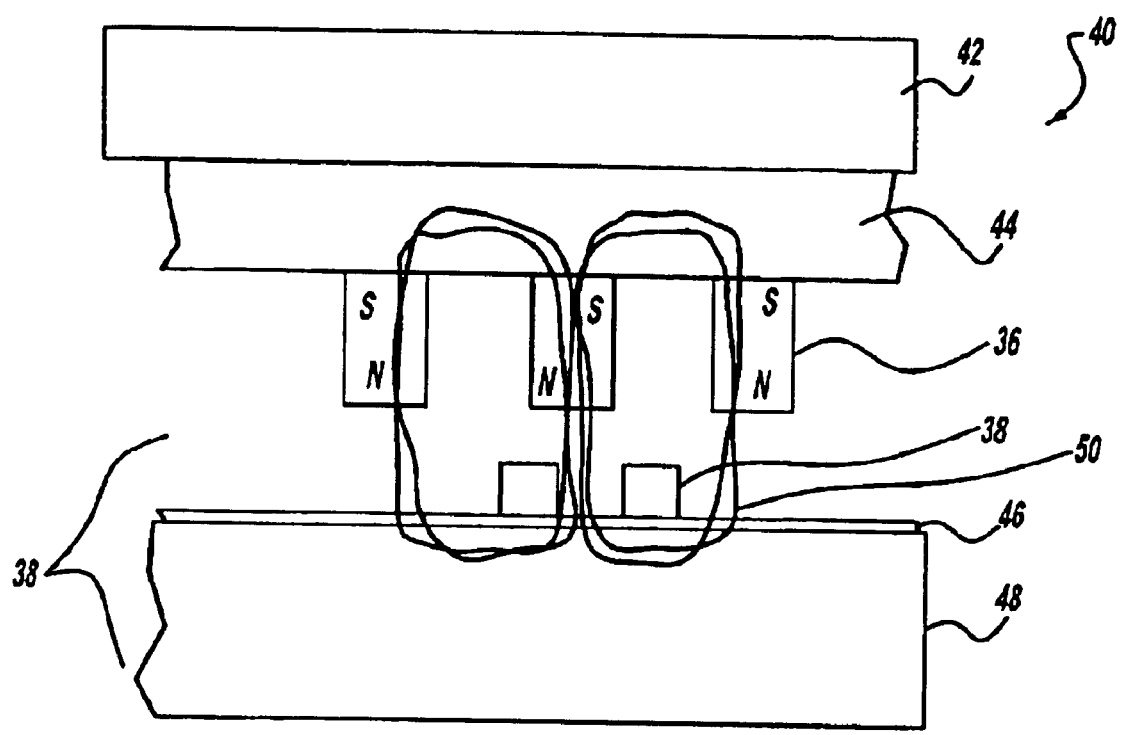
FIG. 5 is an electric machine made using a soft magnetic carrier to direct the magnetic flux from the permanent magnets through a planar coil.

Illustrated in FIG. 5 in a cross-sectional view of a spray-deposited permanent magnet array 36 and a planar coil 38 produced by the method described above. If the coil 38 is integrally assembled with a moving element or "rotor", then the electrical EMF must be extracted through some type of mechanical commutator arrangement which is well-known in the art (e.g., DC motor/generator) Alternatively, the moving permanent magnet array can be envisioned with a stationary coil set obviating the need for a commutator (e.g., brushless permanent magnet motor/generator) It will be apparent that integral permanent magnets developed by a simple spray process could be incorporated into various moving features of the motor with planar coils arranged adjacently to extract electrical power as required, or alternatively to produce resultant forces which could act as a braking or accelerating elements.

The motor 40 is made from a support 42 secured to the core 44. Depending on the physical requirements of the motor 40, the support 42 may be eliminated. This is useful if the permanent magnets 36 are directly applied to a motor component such as the motor housing or the rotor. The core 44 may be optimized to conduct the magnetic flux 50. Materials such as cast iron and steel are suitable conduits for the magnetic flux between the permanent magnets 36. Assemblies can be produced that take advantage of magnetically-soft, rotating articles in a vehicle, such as the engine flywheel, to act as the carrier. The carrier 44 directs the magnetic flux 50 between adjacent magnets 36, where the magnetic flux lines penetrate the area defined by the coil 38 are enhanced by the underlying soft magnetic material of the carrier. Electrical insulation 46 between the coil 38 and an armature core 48 isolates the coil 38, from the armature core 48. It will also be apparent that the magnetic flux 50 penetrating the area defined by the coil 38, can also be greatly enhanced through a symmetric arrangement of magnets on either side of the coil 38. The concentration on of magnetic flux lines by the judicious arrangement of soft magnetic elements will increase the effective power density of an electric machine employing this construction.

In some cases both field and armature functions are combined into a single stationary winding and the rotating element is shaped in order to create a saliency in the magnetic circuit (e.g., synchronous reluctance and switched reluctance machines). The saliency provides a preferred path for the magnetic flux to flow and creates the opportunity to generate reluctance torque. This type of machine is often considered the simpler to build, since the rotating element is a single medium, passive device.

High-velocity, cold spray deposition processes provide a means to produce electromagnetic design elements in robust, planarized form on inert substrates such as metals with insulating coatings, ceramics or polymers. Such devices can allow for simple motors and generators or alternators to be fabricated on the surfaces of other devices, or as free-standing appliances. Planarized starter/alternators for example could be envisioned that offer unique packaging opportunities. Alternatively, one could imagine miniature "generators" built into braking system surfaces for regenerative energy recovery. By effectively "printing" these devices using cold spray depositions, the manufacturing costs could be reduced from current means while also being adapted to the mechanical systems at hand.

The invention has been described as a method of fabricating permanent magnets, soft magnetics and electrical conductors in the form of patterned deposits on supporting structures. While the best modes for carrying out the invention have been described in detail, those familiar with the art to which this invention relates will recognize various alternative designs and embodiments for practicing the invention as defined by the following claims.

What is claimed is:

1. A method of producing a permanent magnet comprising the steps of:

preparing an admixture of magnetic material and binder material, said admixture having a particle size less than 325 mesh;

heating a carrier gas to a temperature substantially below the melting point of either component of said admixture;

introducing said admixture into said carrier gas;

spraying said admixture atop a ductile carrier, said admixture adhering to said carrier;

forming a solid permanent magnet; and applying a magnetic field to said magnet to induce a permanent magnetic moment.

2. The method of claim 1, wherein said magnetic material is selected from the group consisting of iron, nickel, cobalt, samarium-cobalt, aluminum-nickel-cobalt, neodymium-iron-boron and samarium-iron-nickel or mixtures thereof.

3. The method of claim 2, wherein said binder material is selected from the group consisting of iron, nickel or cobalt or mixtures thereof.

4. The method of claim 1, wherein said carrier is aluminum.

5. The method of claim 1, wherein said carrier is iron.

6. A method of producing a permanent magnet attached to a component of an electric machine comprising the steps of:

preparing an admixture of magnetic material and binder material;

heating a carrier gas to a temperature substantially below the melting point of either component of said admixture;

introducing said admixture into said carrier gas;

spraying said admixture atop said component, said admixture adhering to said component;

forming a solid permanent magnet adhered to said component; and applying a magnetic field to said magnet to induce a permanent magnetic moment.

7. The method of claim 6, wherein said admixture of magnetic material and binder material have a particle size less than 325 mesh.

8. The method of claim 6, wherein said magnetic material is selected from the group consisting of iron, nickel, cobalt, samarium-cobalt, aluminum-nickel-cobalt, neodymium-iron-boron and samarium-iron-nickel or mixtures thereof.

9. The method of claim 6, wherein said binder material is selected from the group consisting of iron, nickel or cobalt or mixtures thereof.

10. The method of claim 6, wherein said carrier is aluminum.

11. The method of claim 6, wherein said carrier is iron.

12. The method of claim 6, wherein said electric machine is a motor.

13. The method of claim 6, wherein said electric machine is a generator.

14. The method of claim 6, further comprising the step of kinetically spraying a conductor coil atop a second component of said machine.

15. The method of claim 14, further comprising the step of aligning said component and said second component whereby said magnetic moment penetrates the coil.

* * * * *